Nov. 27, 1928.

F. MILLER

BRICK MACHINE

Original Filed Nov. 11, 1926      2 Sheets-Sheet 1

1,693,179

INVENTOR
Frank Miller
BY
ATTORNEY

Nov. 27, 1928.

F. MILLER

BRICK MACHINE 1,693,179

Original Filed Nov. 11, 1926    2 Sheets-Sheet 2

Fig. 2.

INVENTOR
Frank Miller
BY
ATTORNEY

Patented Nov. 27, 1928.

1,693,179

UNITED STATES PATENT OFFICE.

FRANK MILLER, OF CLAYSBURG, PENNSYLVANIA.

BRICK MACHINE.

Application filed November 11, 1926, Serial No. 147,642. Renewed May 2, 1928.

This invention relates to machines with particular reference to devices for making bricks.

One of the objects of the invention is to provide means to transport the raw material in quantities sufficient to make six bricks to moulds at a high rate of speed.

A further aim is in the provision of a device to carry away the moulds to any desired destination.

A still further aim is to provide means to control the speed of an oscillating brick making machine.

These and other objects which will become apparent as the description progresses, are accomplished by the novel construction, combination and arrangement of parts, hereinafter described and illustrated in the accompanying drawing, forming a material part of this disclosure, and in which:—

Figure 2 is a partial vertical sectional view taken on line 2—2 of Figure 1.

Figure 1:
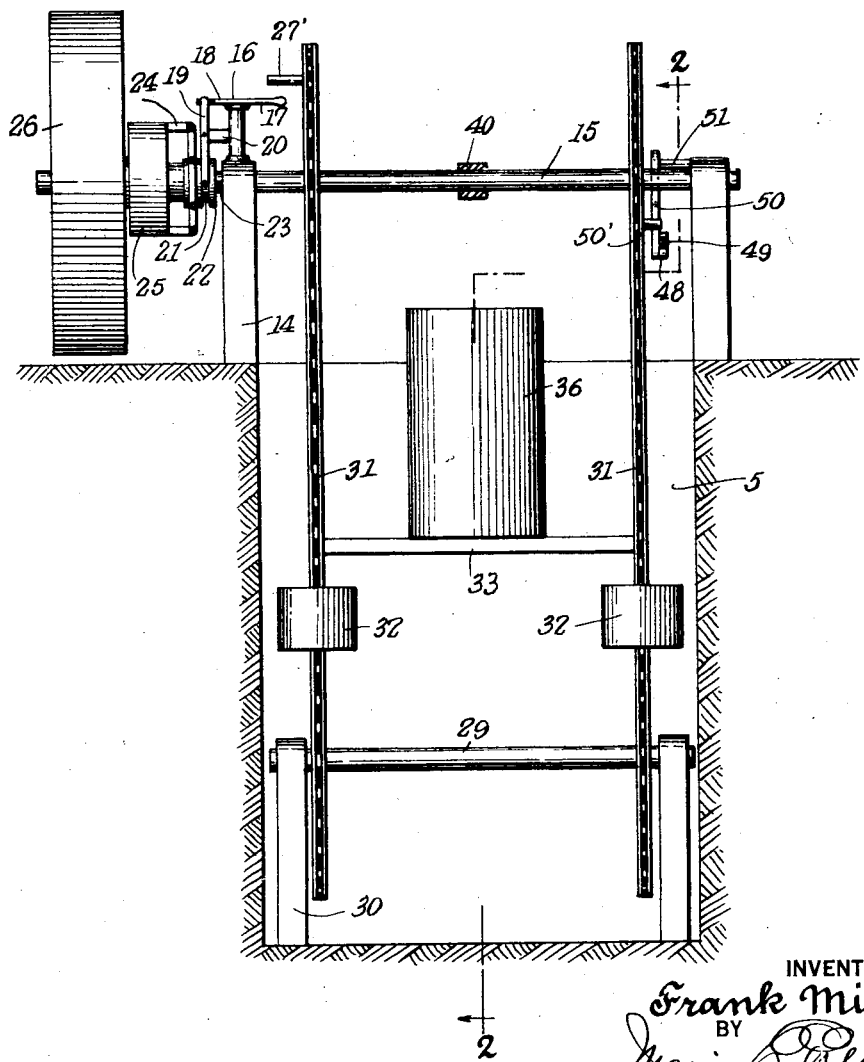
Figure 1 is a partial end elevational view of a device made in accordance with the disclosure herein.

In the drawing, the numeral 5 generally designates an excavation in the surface of the earth, closely adjacent which is a hopper 6 in which is stored the material from which the bricks are to be made, its apex being large enough for the passage therethrough of the plastic material.

Actuated by any preferred means, fixed below the hopper 6, is a shaft 7 having an eccentric 8, fixed thereto and operable in a rim 9 having an extending arm 10 pivoted at 11 to a pan 12 in the opposite end of which is an opening 13.

Thus, revolving the shaft 7 will give the pan 12 a reciprocating motion.

Mounted at right angles to the hopper 6 on opposite sides of the pit 5 are a pair of bearings 14 in which is journalled a shaft 15.

Secured on the top of one of the bearings 14 is an upright 16 having a horizontal lever 17 pivoted at its upper end; the lever being bevelled at 18 to slidingly engage a vertical lever 19 pivoted to an arm 20 formed on the upright 16.

The lower end of the lever 19 is engageable in an annular groove 21 of a sliding member 22 keyed at 23 to the shaft 15.

The sleeve 22 is connected by pivoted arms 24 to a clutch member 25 containing a mating friction clutch member, not shown, by which a pulley 26, rotatably mounted on the end of the shaft 15, may drive the same; the pulley having trained thereon, a belt to give the same a continuous motion in one direction.

Fixed on the shaft 15 intermediate the bearings 14, are a pair of spaced sprocket wheels 27, one of which carries a pin 27' in alignment with a second pair of similar wheels 28 fixed on a shaft 29 journalled in bearings 30 mounted at the bottom of the pit 5.

The sprocket wheels 27 and 28 are connected in pairs by endless chains 31 carrying weight 32; the chains being connected by a cross bar 33 having centrally secured thereon, a piston rod 34 fixed to a piston 35 operable in a cylinder 36 attached by an arm 37 to the wall of the pit 5.

The cylinder 36 contains near its upper end, a plurality of air pipes 38; each pipe having an air valve 39 therein to automatically control the speed with which the piston 35 rises against the weights 32.

Fixed on the shaft 15 is a rod 40 carrying at its outer end a tray 41 capable of receiving material sufficient to make six bricks from the sliding pan 12, as will later be described.

Mounted on the edge of the pit, opposite the hopper 6 is a pair of bearings 42 in which is journalled a shaft 43 having fixed thereon a wheel 44 over which is trained a horizontal 30 or 40 feet long endless conveyor 45 carrying moulds, not shown, having a capacity of 6 bricks received from the tray 41, later more fully described.

Formed integrally with one of the bearings 42 is a support 46 having at its upper end, a sleeve 47 in which is slidable a lever 48 pivoted at 49 to a cam 50 engageable with a pin 50' on the wheel 27, the cam being rotatably mounted on a projecting rod 51 formed on one of the bearings 14. The opposite end of the lever 48 has a projection 52 slidingly engageable with bevelled surfaces of lugs 53 secured at spaced intervals to the endless conveyor 45.

Thus in operation, while the machine is standing still with the weights 32 up, the piston 35 down, the pin 50' engaging the cam 50, the clutch 25 disengaged, and the conveyor 45 running, the pan 41 receives a charge of material from the feeder 12.

As the conveyor moves, the lugs 53 slide the arm 48, releasing the cam 50 from the pin 50' causing the shaft 15 to make a half turn because of the weights 32. Thus the material in the pan 41 is slammed into the moulds of the conveyor, making six bricks.

The force with which the pan 41 hits the moulds is broken by the compression of the piston 35 in the cylinder 36.

The lever 17 is then engaged by the pin 27' which reverses the machine, bringing the pan 41 back into position to receive another charge.

Thus it may be seen that a machine for making bricks has been disclosed that is relatively simple and more efficient, when compared to such devices as are being used at present and while considerable detail has been gone into, the foregoing is to be construed merely as illustrative, as obviously, changes in construction and details thereof, may be made without departing from the spirit and scope of the appended claims.

Having thus described my invention, what I claim as new and desire to secure by Letters Patent, is:—

1. A brick making machine comprising a plurality of bearings adjacent and at the bottom of a pit, shafts journalled in said bearings, connections between said shafts and means on one of said shafts to transport plastic material from a storage hopper to a plurality of moulds.

2. In a brick making machine, a plurality of bearings, adjacent and at the bottom of a pit, shafts journalled in said bearings, sprocket wheels on said shafts, endless chains connecting said wheels, means to drive said shaft, a clutch between said driving means and said shaft and cam means on one of said wheels to actuate said clutch.

3. In a brick making machine, a plurality of bearings, adjacent and at the bottom of a pit, shafts journalled in said bearings, sprocket wheels on said shafts, endless chains connecting said wheels, means to rotate said shafts, weight actuated means on said chains to reverse the motion of said shafts and a compressed air actuated checker connected to said chains to control the speed of said reverse motion.

In witness whereof I have affixed my signature.

FRANK MILLER.